(12) United States Patent
Ahn

(10) Patent No.: US 12,170,046 B2
(45) Date of Patent: Dec. 17, 2024

(54) POWER SYSTEM FOR DISPLAY APPARATUSES

(71) Applicant: LX SEMICON CO., LTD., Daejeon (KR)

(72) Inventor: Yong Sung Ahn, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/343,432

(22) Filed: Jun. 28, 2023

(65) Prior Publication Data

US 2023/0360577 A1 Nov. 9, 2023

Related U.S. Application Data

(63) Continuation of application No. 17/745,030, filed on May 16, 2022, now Pat. No. 11,727,844.

(30) Foreign Application Priority Data

May 27, 2021 (KR) .................. 10-2021-0068244

(51) Int. Cl.
*G09G 3/20* (2006.01)
*G06T 7/00* (2017.01)
(Continued)

(52) U.S. Cl.
CPC ............ *G09G 3/20* (2013.01); *G06T 7/0002* (2013.01); *G06T 7/11* (2017.01); *G06T 7/90* (2017.01);
(Continued)

(58) Field of Classification Search
CPC ............ G09G 3/20; G09G 2320/0233; G09G 2320/043; G09G 2330/021;
(Continued)

(56) References Cited

U.S. PATENT DOCUMENTS

| 10,559,254 B2 * | 2/2020 | Park ............... G09G 3/3233 |
| 2008/0137159 A1 * | 6/2008 | Lim ............... G06T 11/001 |
| | | 358/520 |

(Continued)

FOREIGN PATENT DOCUMENTS

| JP | 2012-141332 A | 7/2012 |
| JP | 2014-122997 A | 7/2014 |

(Continued)

OTHER PUBLICATIONS

Office Action issued for Korean Patent Application No. 10-2021-0068244 on Sep. 30, 2024, 12 pages.

*Primary Examiner* — Sejoon Ahn
(74) *Attorney, Agent, or Firm* — ROTHWELL, FIGG, ERNST & MANBECK, P.C.

(57) ABSTRACT

A power system for display apparatuses, which may predict in real time the amount of supplied current for displaying an image in a display apparatus, includes an image data analyzer analyzing image data input from the outside to predict a pixel degradation degree of each of pixels included in a display panel and predicting an amount of current supplied to the display panel on the basis of the predicted pixel degradation degree and a power supply supplying the display panel with power corresponding to the predicted amount of supplied current.

17 Claims, 9 Drawing Sheets

(51) Int. Cl.
*G06T 7/11* (2017.01)
*G06T 7/90* (2017.01)

(52) U.S. Cl.
CPC .............. *G06T 2207/10024* (2013.01); *G06T 2207/20021* (2013.01); *G06T 2207/20084* (2013.01); *G09G 2320/0233* (2013.01); *G09G 2320/043* (2013.01); *G09G 2330/021* (2013.01); *G09G 2360/16* (2013.01)

(58) Field of Classification Search
CPC ......... G09G 2360/16; G06T 7/11; G06T 7/90; G06T 7/0002; G06T 2207/10024; G06T 2207/20021; G06T 2207/20084
See application file for complete search history.

(56) References Cited

U.S. PATENT DOCUMENTS

| | | | |
|---|---|---|---|
| 2014/0240305 A1 | 8/2014 | Chae et al. | |
| 2016/0171931 A1* | 6/2016 | Liu | G09G 3/3208 345/694 |
| 2016/0189631 A1* | 6/2016 | Kim | G09G 3/3266 345/212 |
| 2017/0206819 A1* | 7/2017 | Pyo | G09G 3/2092 |
| 2020/0058252 A1* | 2/2020 | Kim | G09G 3/3258 |
| 2020/0372859 A1* | 11/2020 | Kim | G09G 3/3225 |
| 2021/0065606 A1* | 3/2021 | Park | G09G 3/2003 |
| 2021/0110787 A1* | 4/2021 | Buckley | G06T 5/77 |
| 2021/0383174 A1* | 12/2021 | Holzer et al. | G06N 20/00 |
| 2021/0383760 A1* | 12/2021 | In | G09G 3/3266 |
| 2021/0389258 A1* | 12/2021 | Wang | G06V 10/764 |
| 2021/0389863 A1* | 12/2021 | Lin | G09G 3/20 |
| 2021/0390375 A1* | 12/2021 | Luo | G06N 3/042 |
| 2022/0059003 A1* | 2/2022 | Hack | G09G 3/2003 |

FOREIGN PATENT DOCUMENTS

| | | |
|---|---|---|
| KR | 10-2014-0108604 A | 9/2014 |
| KR | 10-2016-0078767 A | 7/2016 |
| KR | 10-2017-0030119 A | 3/2017 |
| KR | 10-2019-0063936 A | 6/2019 |

\* cited by examiner

POWER SYSTEM FOR DISPLAY APPARATUSES

CROSS-REFERENCE TO RELATED APPLICATIONS

This application is a continuation application of U.S. patent application Ser. No. 17/745,030 filed on May 16, 2022, which claims priority from Korean Patent Application No. 10-2021-0068244, filed on May 27, 2021, all of which are hereby incorporated by reference as if fully set forth herein.

FIELD OF THE INVENTION

The present disclosure relates to a power system, and more particularly, to a power system for display apparatuses.

BACKGROUND

With the advancement of the information age, the demand for a display device for displaying an image has increased with various forms. Therefore, various types of display devices such as a non-self-light emitting display device including a liquid crystal display (LCD) device and an electroluminescence display device including an organic light emitting display (OLED) device and a quantum dot light emitting display (QLED) device have been recently used.

Display apparatuses include a power system which generates a driving power needed for driving of a display panel by using power supplied from the outside. A power system of the related art senses a current consumed by the display panel and controls an inductor on the basis of the sensed current to supply the driving power to the display panel.

The power system of the related art has a problem where a power needed for displaying an image on the display panel is not supplied in real time. When a gray level of an image is severely changed or a degradation occurs in some of pixels included in the display panel, a ripple may increase or a response time and a stabilization time may be much taken.

SUMMARY

Accordingly, the present disclosure is directed to providing a power system for display apparatuses that substantially obviates one or more problems due to limitations and disadvantages of the related art.

An aspect of the present disclosure is directed to providing a power system for display apparatuses, which may predict in real time the amount of supplied current for displaying an image in a display apparatus.

Another aspect of the present disclosure is directed to providing a power system for display apparatuses, which may stably supply a driving power.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

In accordance with an aspect of the disclosure, the above and other technical benefits can be accomplished by the provision of a power system for display apparatuses comprising an image data analyzer analyzing image data input from the outside to predict a pixel degradation degree of each of pixels included in a display panel and predicting an amount of current supplied to the display panel on the basis of the predicted pixel degradation degree and a power supply supplying the display panel with power corresponding to the predicted amount of supplied current.

In accordance with an aspect of the disclosure, the above and other technical benefits can be accomplished by the provision of a power system for display apparatuses comprising an image data analyzer obtaining saturation data and luminance data of an image from image data input to a display panel and predicting an amount of current supplied to the display panel on the basis of the obtained saturation data and luminance data and a power supply supplying the display panel with power corresponding to the predicted amount of supplied current.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Reference will now be made in detail to the exemplary embodiments of the present disclosure, examples of which are illustrated in the accompanying drawings. Wherever possible, the same reference numbers will be used throughout the drawings to refer to the same or like parts.

In a case where 'comprise', 'have', and 'include' described in the present specification are used, another part may be added unless 'only~' is used. The terms of a singular form may include plural forms unless referred to the contrary.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or totally coupled to or combined with each other, and may be variously inter-operated and driven technically. The embodiments of the present disclosure may be carried out independently from each other or may be carried out together with a co-dependent relationship.

Hereinafter, exemplary embodiments of the present disclosure will be described with reference to the accompanying drawings.

Figure 1:
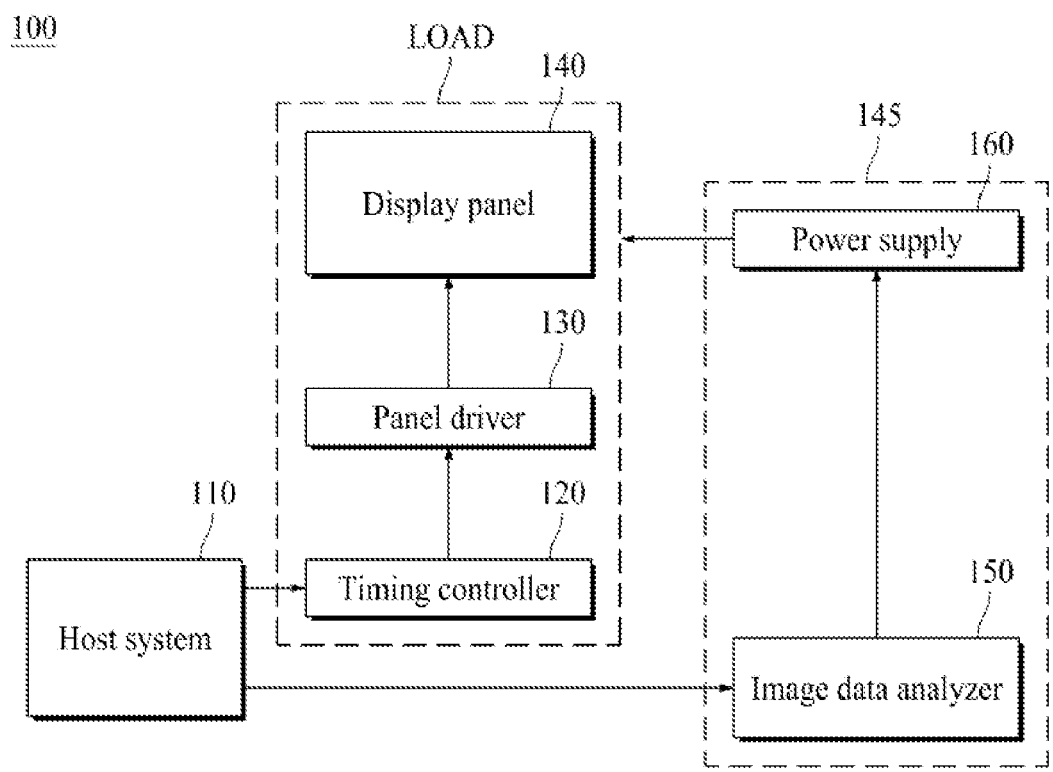
FIG. 1 is a diagram schematically illustrating a display apparatus according to an embodiment of the present disclosure.

FIG. 1 is a diagram schematically illustrating a display apparatus 100 according to an embodiment of the present disclosure.

The display apparatus 100 according to an embodiment of the present disclosure, as illustrated in FIG. 1, may include a host system 110, a timing controller 120, a panel driver 130, a display panel 140, and a power system 145.

Although a description has been described based on that the display apparatus 100 according to the embodiment of the present disclosure is embodied as an organic light emitting display device, the display apparatus 100 may be embodied as a Liquid Crystal Display device (LCD), a Field Emission Display (FED), a Plasma Display Panel (PDP), a Quantum dot Light Emitting Display (QLED), or an Electrophoresis Display device (EPD).

The display panel 140 may include a display area where a plurality of pixels are provided to display an image. The display panel 140 may include a plurality of data lines, a plurality of gate lines, and the plurality of pixels. Each of the data lines may receive a data signal, and each of the gate lines may receive a gate signal. The data lines may be formed to intersect with the gate lines. The pixels may be respectively provided in a plurality of areas defined by an intersection structure between the gate lines and the data lines.

Each of the pixels of the display panel 140 may be connected to one of the data lines and one of the gate lines. Each of the pixels of the display panel 140 may include a driving transistor which adjusts a drain-source current thereof on the basis of a data voltage applied to a gate electrode thereof, a transistor which is turned on by the gate signal of a gate line and transfers a data voltage of a data line to the gate electrode of the driving transistor, an organic light emitting diode which emits light on the basis of the drain-source current of the driving transistor, and a capacitor which stores a voltage at the gate electrode of the driving transistor. Accordingly, each of the pixels may emit light on the basis of a current supplied to the organic light emitting diode.

The panel driver 130 may receive a control signal from the timing controller 120 and may control driving of the display panel 140. To this end, the panel driver 130 may include a data driver and a gate driver.

The gate driver may generate gate signals for driving the display panel 140 in response to a gate control signal input from the timing controller 120. The gate driver may supply, through the gate lines, the generated gate signals to subpixels of each of the pixels included in the display panel 140.

The data driver may receive a data control signal and an image data signal from the timing controller 120. The data driver may convert a digital image data signal into an analog image data signal in response to a data control signal input from the timing controller 120. The data driver may supply, through the data lines, the converted image data signal to the subpixels of each of the pixels included in the display panel 140.

The timing controller 120 may receive image data and a timing signal from the host system 110. The image data may correspond to digital video data, and the timing signal may include a vertical synchronization signal, a horizontal synchronization signal, a data enable signal, and a dot clock.

Moreover, the timing controller 120 may generate a control signal for controlling an operation timing of the panel driver 130. In detail, the timing controller 120 may generate the data control signal for controlling an operation timing of the data driver and the gate control signal for controlling an operation timing of the gate driver on the basis of timing signals. The timing controller 120 may output the image data and the data control signal to the data driver and may output the gate control signal to the gate driver.

The host system 110 may transfer the image data and the timing signal to the timing controller 120. At this time, the host system 110 may convert the image data into a format suitable for displaying an image on the display panel 140. The host system 110 may be implemented as one of a television system, a set-top box, a navigation system, a DVD player, a blue-ray player, a personal computer (PC), a home theater system, and a phone system and may receive an input image.

Also, the host system 110 may supply a power to the power system 145. The host system 110 according to an embodiment of the present disclosure may provide image data to the power system 145. This will be described below with reference to FIGS. 2 to 8.

The power system 145 may generate a driving power needed for driving of the display panel 140 by using power supplied from the external host system 110. The display panel 140 and the timing controller 120 and panel driver 130 for driving the display panel 140 may correspond to a load in terms of the power system 145.

The power system 145 according to an embodiment of the present disclosure may receive image data from the host system 110. The power system 145 may analyze the received image data to predict the amount of supplied current and may supply the display panel 140 with power corresponding to the predicted amount of supplied current.

To this end, the power system 145 may include an image data analyzer 150 and a power supply 160. The image data analyzer 150 and the power supply 160 may be implemented as one physical element (for example, one chip), but are not limited thereto. The image data analyzer 150 may be implemented as a separate micro controller unit (MCU), or may be implemented in the timing controller 120.

Hereinafter, the image data analyzer 150 and the power supply 160 will be described in more detail with reference to FIGS. 2 and 3.

Figure 2:
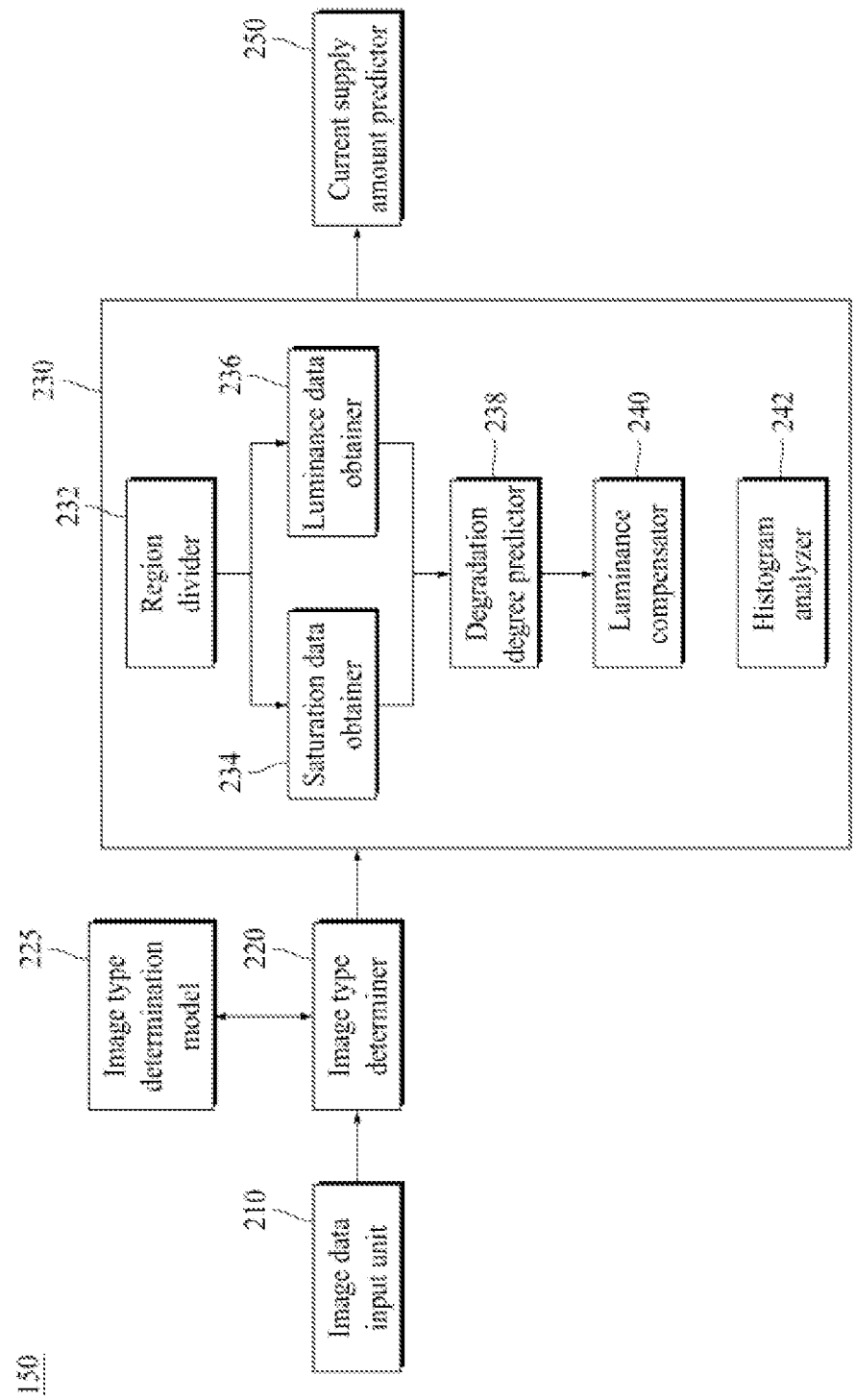
FIG. 2 is a diagram illustrating a configuration of the image data analyzer of FIG. 1.

FIG. 2 is a diagram illustrating a configuration of the image data analyzer of FIG. 1.

Referring to FIG. 2, the image data analyzer 150 may analyze image data to predict a pixel degradation degree of each of the pixels included in the display panel 140 and may predict the amount of current supplied to the display panel 140. To this end, the image data analyzer 150 may include an image data input unit 210, an analyzer 230, and a current supply amount predictor 250.

The image data input unit 210 may receive the image data from the external host system 110. The host system 110 may convert the image data into a format suitable for displaying an image on the display panel 140 and may transfer the converted image data to the timing controller 120 and the image data analyzer 150.

The analyzer 230 may analyze the image data. To this end, the analyzer 230 may include a region divider 232, a saturation data obtainer 234, a luminance data obtainer 236, a degradation degree predictor 238, a luminance compensator 240, and a histogram analyzer 242.

The histogram analyzer 242 may analyze a histogram of the image data. In detail, the histogram analyzer 242 may analyze the histogram of the image data to obtain a grayscale-based frequency number of each of a plurality of colors. The image data may include color and grayscale information about each of the pixels. The color may include red, green, and blue, and a gray level may include 0 to 255.

The histogram analyzer 242 may obtain at least one of a color-based frequency number for each line and a grayscale-based frequency number for each line. The line may correspond to a gate line. In an embodiment, the histogram analyzer 242 may obtain at least one of a color-based frequency number for each frame and a grayscale-based frequency number for each frame. In another embodiment, the histogram analyzer 242 may obtain at least one of a color-based frequency number for each driving IC and a grayscale-based frequency number for each driving IC.

The histogram analyzer 242 may perform histogram analysis on the basis of the image data input to the image data input unit 210, but is not limited thereto. In a case where the luminance of the image data input to the image data input unit 210 is compensated for based on the pixel degradation degree, the histogram analyzer 242 may perform histogram analysis on the basis of image data in which luminance compensation is reflected.

Figure 4:
FIG. 4 is a diagram illustrating an example in which an image is divided into a plurality of regions.

The region divider 232 may divide an image into a plurality of regions. The region divider 232, as illustrated in FIG. 4, may divide the image into a plurality of regions each having a certain size. A plurality of pixels may be respectively provided in the plurality of regions. When saturation data and luminance data of all pixels are obtained, a data throughput may increase, and thus, a data processing speed may be slowed. Also, a data throughput which is to be stored and managed by the power system 145 may increase.

The power system 145 according to an embodiment of the present disclosure may divide the image into the plurality of regions on the basis of the data processing speed and the data throughput and may obtain saturation data and luminance data of each region. In this case, each of the plurality of regions may have a predetermined size, but is not limited thereto.

In an embodiment, the region divider 232 may determine a size of a region on the basis of the type of an image corresponding to the image data. To this end, the image data analyzer 150 may further include an image type determiner 220 and an image type determination model 225.

The image type determiner 220 may input an image to the image type determination model 225 to determine an image type. The image type determination model 225 may correspond to a model which has previously learned an image type of an image by using a convolution neural network (CNN) algorithm. When an image is input, the image type determination model 225 may output one of a plurality of image types as an image type of a corresponding image. For example, the image type may include an animal, a person, a scene, a center of town, night, daytime, or a text. When an image including an animal is input, the image type determination model 225 may output the animal as an image type of a corresponding image.

The region divider 232 may determine a size of a region which is to be divided based on an image type determined by the image type determiner 220. A size of a region corresponding to each of the plurality of image types may be predetermined, or may be set by a user. For example, in the text or night of the image types, a change in image characteristic such as a gray level, a saturation, or luminance may be small, and thus, a size of a divided region may be set to be relatively large. On the other hand, in the animal or center of town of the image types, a change in image characteristic such as a gray level, a saturation, or luminance may be large, and thus, a size of a divided region may be set to be relatively small.

In another embodiment, the region divider 232 may determine a size of a region divided based on a color-based and grayscale-based frequency number analyzed by the histogram analyzer 242. The region divider 232 may calculate a gray level use rate on the basis of the grayscale-based frequency number. The gray level use rate may represent the number of gray levels where a frequency number to a total gray level is greater than or equal to a reference value. The region divider 232 may determine, as a relatively small size, a size of a region divided from an image where a gray level use rate is high and may determine, as a relatively large size, a size of a region divided from an image where a gray level use rate is low.

Figure 5:
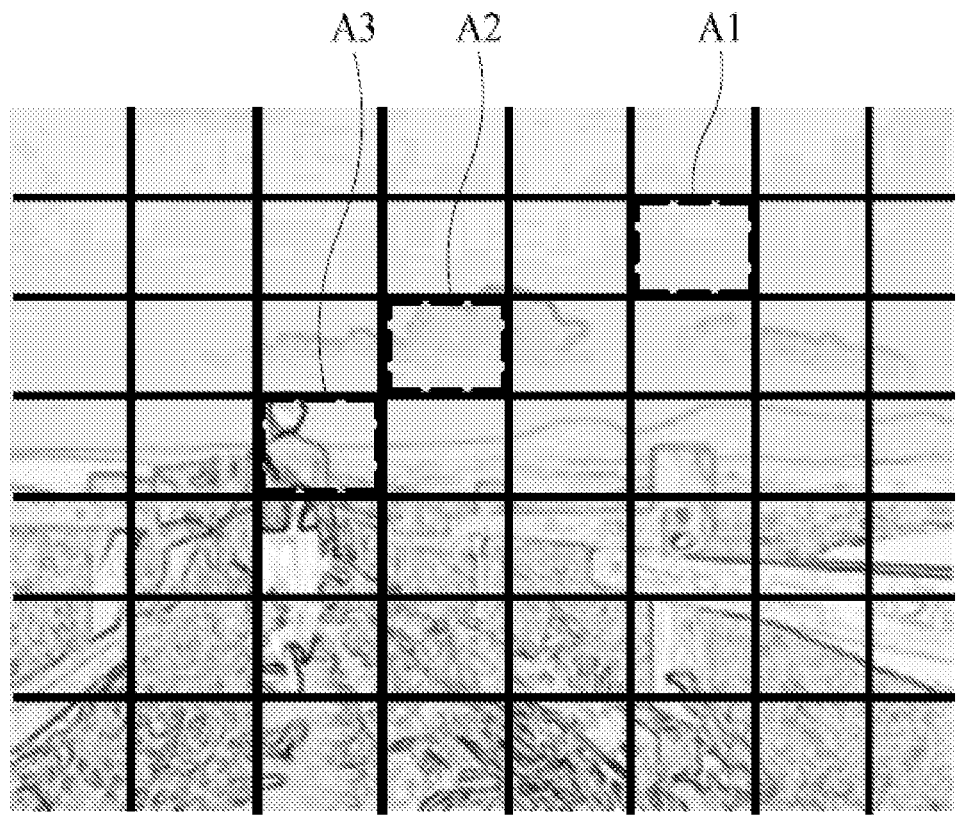
FIG. 5 is a diagram illustrating an example of a saturation variation value of edge pixels in an image divided into a plurality of regions.

The saturation data obtainer 234, as in in FIG. 5, may obtain saturation data of each of a plurality of regions so as to obtain edge information corresponding to a contour in an image. In this case, the saturation data may include a saturation variation value, and particularly, may include a saturation variation value of an edge pixel corresponding to an edge among a plurality of pixels included in a corresponding region.

The saturation data obtainer 234 may calculate a saturation variation value of each of a plurality of pixels included in a corresponding region. The saturation variation value of each pixel may be calculated based on a saturation of a corresponding pixel and a saturation of each of peripheral pixels disposed near the corresponding pixel.

The saturation data obtainer 234 may obtain a saturation variation value of an edge pixel where a saturation variation value is greater than a predetermined threshold value. In this case, the saturation data obtainer 234 may obtain at least one of the number of edge pixels and positions of the edge pixels in a corresponding region along with a saturation variation value of an edge pixel.

In an embodiment, the saturation data may further include a saturation average value of each of a plurality of regions. The saturation data obtainer 234 may group some of the plurality of regions on the basis of the saturation average value.

In detail, the saturation data obtainer 234 may group regions, where saturation average values are the same or similar, of regions disposed at a periphery thereof. In this case, the saturation data obtainer 234 may group regions, including an image corresponding to the same gate line in the display panel 140, into the same group.

Figure 6:
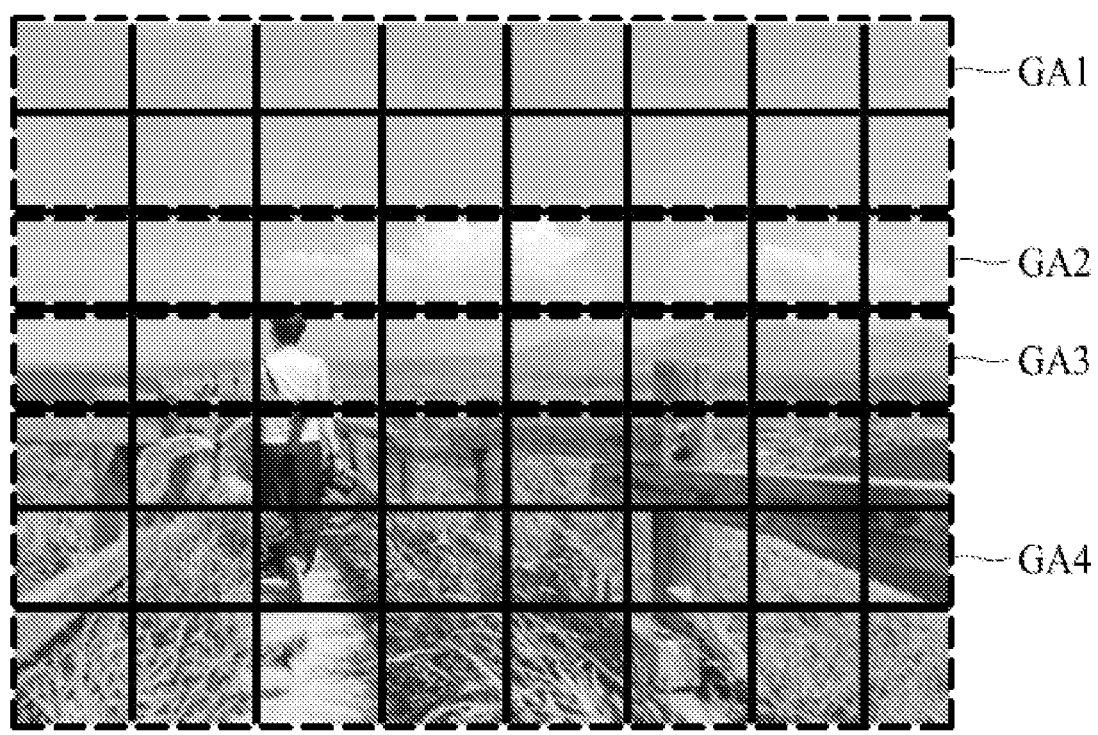
FIG. 6 is a diagram illustrating an example of grouping a plurality of regions based on a saturation data.

For example, when a gate line of the display panel 140 extends in a horizontal direction, a plurality of regions arranged in the horizontal direction may be included in the same group. The plurality of regions, as illustrated in FIG. 6, may be grouped into four group regions (for example, first to fourth group regions) GA1 to GA4 on the basis of a saturation average value. A plurality of regions including a sky image including no cloud may be grouped into the first group region GA1. A plurality of regions including a sky image including a cloud may largely vary in saturation due to a cloud image, and thus, may be grouped into the second group region GA2 instead of the first group region GA1. Also, a plurality of regions including a boundary between mountain and sky may be grouped into the third group region GA3, and a plurality of regions including the other image may be grouped into the fourth group region GA4. The number of group regions may vary based on a similarity range setting value of a saturation average value.

The luminance data obtainer 236 may obtain luminance data of each of a plurality of regions. In this case, the luminance data may include a luminance minimum value and a luminance maximum value.

In an embodiment, in a case where the plurality of regions are grouped based on the saturation average value, the luminance data obtainer 236 may obtain a luminance minimum value and a luminance maximum value of each of a plurality of group regions.

Also, the luminance data obtainer 236 may further obtain a luminance average value of a total image.

The degradation degree predictor 238 may predict a pixel degradation degree of each region on the basis of luminance data and saturation data of each region. In detail, the degradation degree predictor 238 may extract a specific region, where high luminance is continuously maintained, of a plurality of regions and may predict a pixel degradation degree of the specific region. To this end, the degradation degree predictor 238 may analyze a tendency of the luminance data of each region. The degradation degree predictor 238 may analyze a tendency of luminance data by using at least one of a luminance minimum value, a luminance maximum value, and a luminance average value of each region.

The degradation degree predictor 238 may obtain a frequency number of use of high luminance, which is greater than or equal to a reference value, of each region on the basis of tendency analysis. To provide description for example, the degradation degree predictor 238 may obtain a frequency number of use of high luminance of 400 nit or more in each region. When a luminance maximum value, a luminance minimum value, or a luminance average value is greater than or equal to 400 nit, the degradation degree predictor 238 may determine that a high luminance of 400 nit or more is used.

In an embodiment, the degradation degree predictor 238 may compare luminance value of each region with a luminance average value of a total image through tendency analysis to obtain a frequency number of use of high luminance which is greater than or equal to a reference value.

To provide description for example, the degradation degree predictor 238 may obtain a frequency number of use of high luminance which is four or more times the luminance average value, according to a luminance average value of a total image. When the luminance average value of the total image is 50 nit, the degradation degree predictor 238 may determine that high luminance is used when a luminance maximum value, a luminance minimum value, or a luminance average value of a region is greater than or equal to 200 nit.

To provide description as another example, the degradation degree predictor 238 may obtain a frequency number of use of high luminance of 300 nit or more in accordance with the luminance average value of the total image. When the luminance average value of the total image is 50 nit, the degradation degree predictor 238 may determine that high luminance is used when a luminance maximum value, a luminance minimum value, or a luminance average value of a region is greater than or equal to 300 nit.

The degradation degree predictor 238 may predict a pixel degradation degree of each region on the basis of a frequency number of use of high luminance. In an embodiment, the degradation degree predictor 238 may predict a pixel degradation degree based on a frequency number of use of high luminance by using a linear regression model. In this case, the linear regression model may correspond to a model which is learned based on a pixel degradation degree and a frequency number of use of a pixel on which degradation compensation has been previously performed.

Moreover, the degradation degree predictor 238 may analyze a tendency of luminance data of each of a plurality of regions and may predict a pixel degradation degree based on a frequency number of use of high luminance of each of the plurality of regions, but is not limited thereto. In an embodiment, the degradation degree predictor 238 may analyze a tendency of luminance data of only a region, where a difference between a luminance minimum value and a luminance maximum value is large, of a plurality of regions.

It is described that the degradation degree predictor 238 according to an embodiment of the present disclosure predicts a pixel degradation degree of each of a plurality of regions, but the present disclosure is not limited thereto. In another embodiment, when a plurality of regions are grouped based on a saturation average value, the degradation degree predictor 238 may predict a pixel degradation degree of each of a plurality of group regions.

Moreover, the degradation degree predictor 238 may predict a pixel degradation degree by further using saturation data of each region in addition to luminance data of each region. The saturation data may include a saturation variation value of an edge pixel, and moreover, may further include at least one of the number of edge pixels and positions of the edge pixels.

A pixel degradation degree may increase as a saturation variation value of an edge pixel increases, the number of edge pixels included in a corresponding region increases, or a frequency number (i.e., a frequency number of use of an edge pixel) of use of an edge pixel at a fixed position increases. For example, as illustrated in FIG. 5, regions A2 and A3 where the number of edge pixels is large may be greater in pixel degradation degree than a region A1 where the number of edge pixels is small. In order to reflect such a characteristic, the degradation degree predictor 238 may increase a pixel degradation degree as a saturation variation value of an edge pixel increases, the number of edge pixels included in a corresponding region increases, or a frequency number of use of an edge pixel increases.

The degradation degree predictor 238 may determine a final pixel degradation degree on the basis of a first pixel degradation degree determined based on a tendency of luminance data and a second pixel degradation degree determined based on a tendency of saturation data. In an embodiment, the degradation degree predictor 238 may assign a weight value to each of the first pixel degradation degree and the second pixel degradation degree and may summate a weight value-assigned first pixel degradation degree and a weight value-assigned second pixel degradation degree to determine a final pixel degradation degree.

The luminance compensator 240 may determine a luminance compensation value of each region. In detail, the luminance compensator 240 may determine a luminance compensation value of each region on the basis of a pixel degradation degree of each of regions. A luminance compensation value based on a pixel degradation degree may be previously stored as a lookup table, and the luminance compensation value may be proportional to a pixel degradation degree representing a pixel degradation level. For example, when the pixel degradation degree has a first value, the luminance compensation value may have a first compensation value, and when the pixel degradation degree has a second value which is less than the first value, the luminance compensation value may have a second compensation value which is less than the first compensation value.

The luminance compensator 240 may check a compensation value corresponding to a pixel degradation degree of a corresponding region in a lookup table and may determine the checked value as a luminance compensation value of the corresponding region.

It is described that the luminance compensator 240 according to an embodiment of the present disclosure determines a luminance compensation value of each region on the basis of a pixel degradation degree predicted by the degradation degree predictor 238, but the present disclosure is not limited thereto.

In another embodiment, a pixel degradation degree predicted by the degradation degree predictor 238 may correspond to a luminance compensation value based on pixel degradation. In this case, the degradation degree predictor 238 may predict a pixel degradation degree based on a frequency number of use of high luminance by using the linear regression model, and the luminance compensator 240 may determine a luminance compensation value to correspond to a pixel degradation degree.

Moreover, it is described that the luminance compensator 240 according to an embodiment of the present disclosure determines a luminance compensation value corresponding to a pixel degradation degree in each of a plurality of regions, but the present disclosure is not limited thereto.

In another embodiment, the luminance compensator 240 may determine whether compensation is performed, on the basis of a luminance minimum value with respect to a total image luminance average value or a luminance maximum value with respect to the total image luminance average value by each region.

When the checked value is greater than a reference value, the luminance compensator 240 may determine that luminance compensation on a corresponding region is needed. Therefore, the luminance compensator 240 may determine a luminance compensation value of a corresponding region on the basis of a pixel degradation degree of the corresponding region. For example, when a total image luminance average value is 50 nit and a luminance minimum value of the corresponding region is 500 nit, the luminance compensator 240 may determine a luminance compensation value of the corresponding region on the basis of a pixel degradation degree of the corresponding region. Because a specific region is bright in a wholly dark image, the luminance compensator 240 may determine that degradation occurring in a corresponding region is recognizable by a user and may perform luminance compensation.

On the other hand, when the checked value is less than the reference value, the luminance compensator 240 may determine that luminance compensation on the corresponding region is not needed. Therefore, the luminance compensator 240 may determine the luminance compensation value of the corresponding region as 0. For example, when the total image luminance average value is 400 nit and the luminance minimum value of the corresponding region is 500 nit, the luminance compensator 240 may determine the luminance compensation value of the corresponding region as 0. Because a specific region is bright in a wholly bright image, the luminance compensator 240 may determine that degradation occurring in a corresponding region is not recognized by the user and may not perform luminance compensation.

The luminance compensator 240 may convert image data input to the image data input unit 210 on the basis of a luminance compensation value of each region.

The current supply amount predictor 250 may predict the amount of supplied current on the basis of the image data. The current supply amount predictor 250 may predict the amount of current supplied to the display panel 140 on the basis of a color/grayscale-based frequency number and a color/grayscale-based current weight value obtained by the histogram analyzer 242. Here, a current weight value may represent a degree to which the supplied current contributes to a driving current and may be stored by color units and by gray level units in a lookup table.

When luminance compensation is performed by the luminance compensator 240, the current supply amount predictor 250 may predict the amount of supplied current on the basis of image data in which the luminance compensation is reflected.

Figure 3:
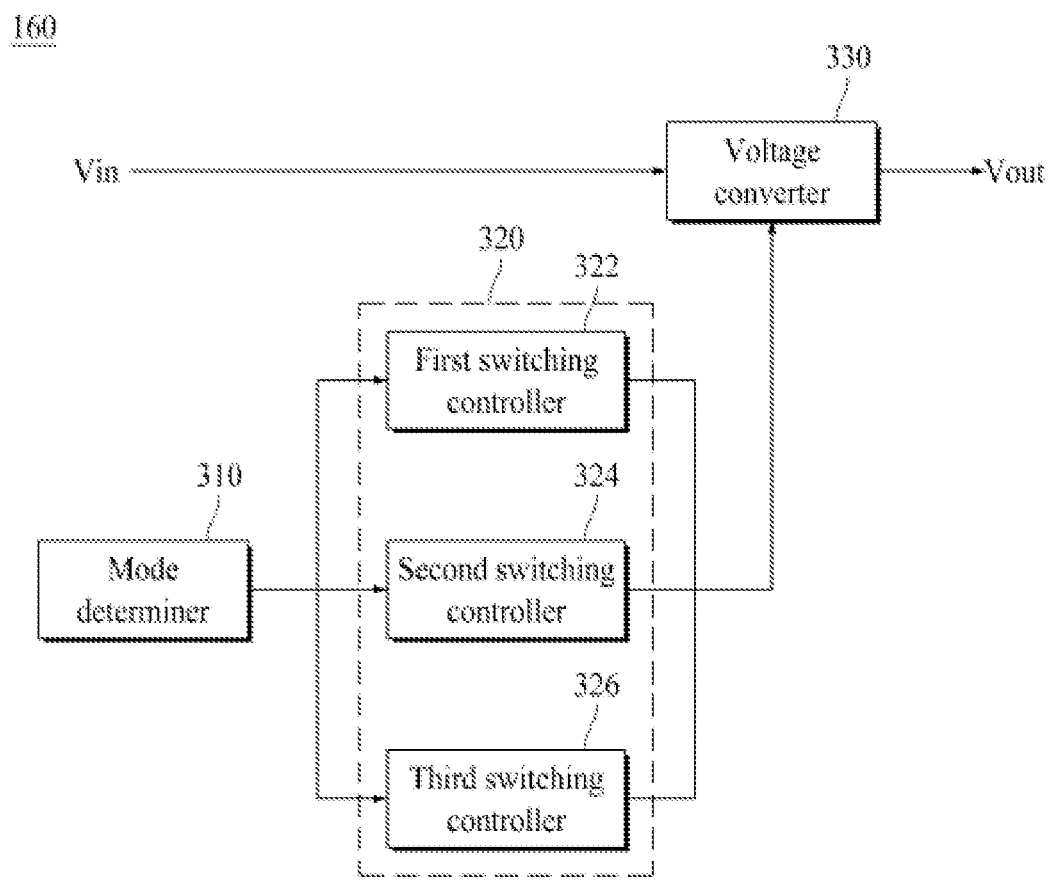
FIG. 3 is a diagram illustrating a configuration of the power supply of FIG. 1.

FIG. 3 is a diagram illustrating a configuration of the power supply of FIG. 1.

Referring to FIG. 3, the power supply 160 may supply the display panel 140 with power corresponding to the amount of supplied current predicted by the image data analyzer 150. To this end, the power supply 160 may include a mode determiner 310, a controller 320, and a voltage converter 330.

The voltage converter 330 may boost an input voltage Vin input from the host system 110 on the basis of a switching operation and may output a boosted output voltage Vout to a load. To this end, the voltage converter 330 may include an inductor, a diode, a capacitor, and a switching transistor.

When the switching transistor is turned on, the inductor may store a current flowing from an input terminal. Subsequently, when the switching transistor is turned off, a current stored in the inductor may be discharged through the diode. Therefore, a voltage Vout at an output terminal may increase, and thus, the output voltage Vout may be boosted to a voltage which is higher than the input voltage Vin. The capacitor may store a boosted output voltage Vout.

The mode determiner 310 may determine an operation mode of the power supply 160 on the basis of the amount of supplied current predicted by the image data analyzer 150. In detail, the mode determiner 310 may determine one of a high power mode, a middle power mode, and a low power mode on the basis of the predicted amount of supplied current.

When the predicted amount of supplied current is a high load, the mode determiner 310 may determine an operation mode of the power supply 160 as the high power mode. When the predicted amount of supplied current is a middle load, the mode determiner 310 may determine an operation mode of the power supply 160 as the middle power mode. When the predicted amount of supplied current is a low load, the mode determiner 310 may determine an operation mode of the power supply 160 as the low power mode.

The controller 320 may control an on/off switching operation of the switching transistor of the voltage converter 330 to allow power, corresponding to the predicted amount of supplied current, to be output to the display panel 140. The controller 320 may generate a switching pulse which is a switching signal for controlling the on/off switching operation of the switching transistor. In this case, the switching pulse may be driven and output through a different scheme on the basis of an operation mode determined by the mode determiner 310. To this end, the controller 320 may include a first switching controller 322 and a second switching controller 324.

When the high power mode is determined by the mode determiner 310, the first switching controller 322 may be driven in a pulse width modulation (PWM) scheme and may perform control so that power corresponding to the predicted amount of supplied current is output to the display panel 140.

The PWM scheme may be a driving scheme where a frequency is constant and an output equivalent voltage in the input voltage Vin is output through turn-on. Because noise occurs periodically in switching, noise may be easily removed, and thus, the PWM scheme may be efficient in a high load where much noise occurs because the amount of used current is high. On the other hand, the PWM scheme may be inefficient in a low load where the amount of used current is not high and an off time is necessarily long.

When the middle power mode or the low power mode is determined by the mode determiner 310, the second switching controller 324 may be driven in a pulse frequency modulation (PFM) scheme and may perform control so that power corresponding to the predicted amount of supplied current is output to the display panel 140.

The PFM scheme may be a driving scheme where an on time is constant and an output equivalent voltage is output by varying a frequency. Because a frequency varies based on the amount of output current, the PFM scheme may be efficient in a low load where the amount of used current is not high. On the other hand, because noise occurring in switching is aperiodic, the PFM scheme may be difficult to remove noise. Therefore, the PFM scheme may not be appropriate for the high load where much noise occurs.

The power supply 160 according to an embodiment of the present disclosure may be driven by the PWM scheme in a high load and may be driven by the PFM scheme in a low load or a middle load, and thus, may perform control so that power is supplied to the display panel 140, thereby enhancing operation efficiency.

Moreover, it is described that the power supply 160 according to an embodiment of the present disclosure is driven by the PFM scheme in the middle power mode, but the present disclosure is not limited thereto. In another embodiment, the controller 320 may further include a third switching controller 326.

When the middle power mode is determined by the mode determiner 310, the third switching controller 326 may be driven by the PWM/PFM scheme and may perform control so that power corresponding to the predicted amount of supplied current is output to the display panel 140. Therefore, the power supply 160 according to an embodiment of the present disclosure may enhance operation efficiency despite a middle load.

Moreover, in FIG. 3, it is illustrated that the mode determiner 310 is included in the power supply 160, but the present disclosure is not limited thereto. In another embodiment, the mode determiner 310 may be included in the image data analyzer 150.

Figure 7:
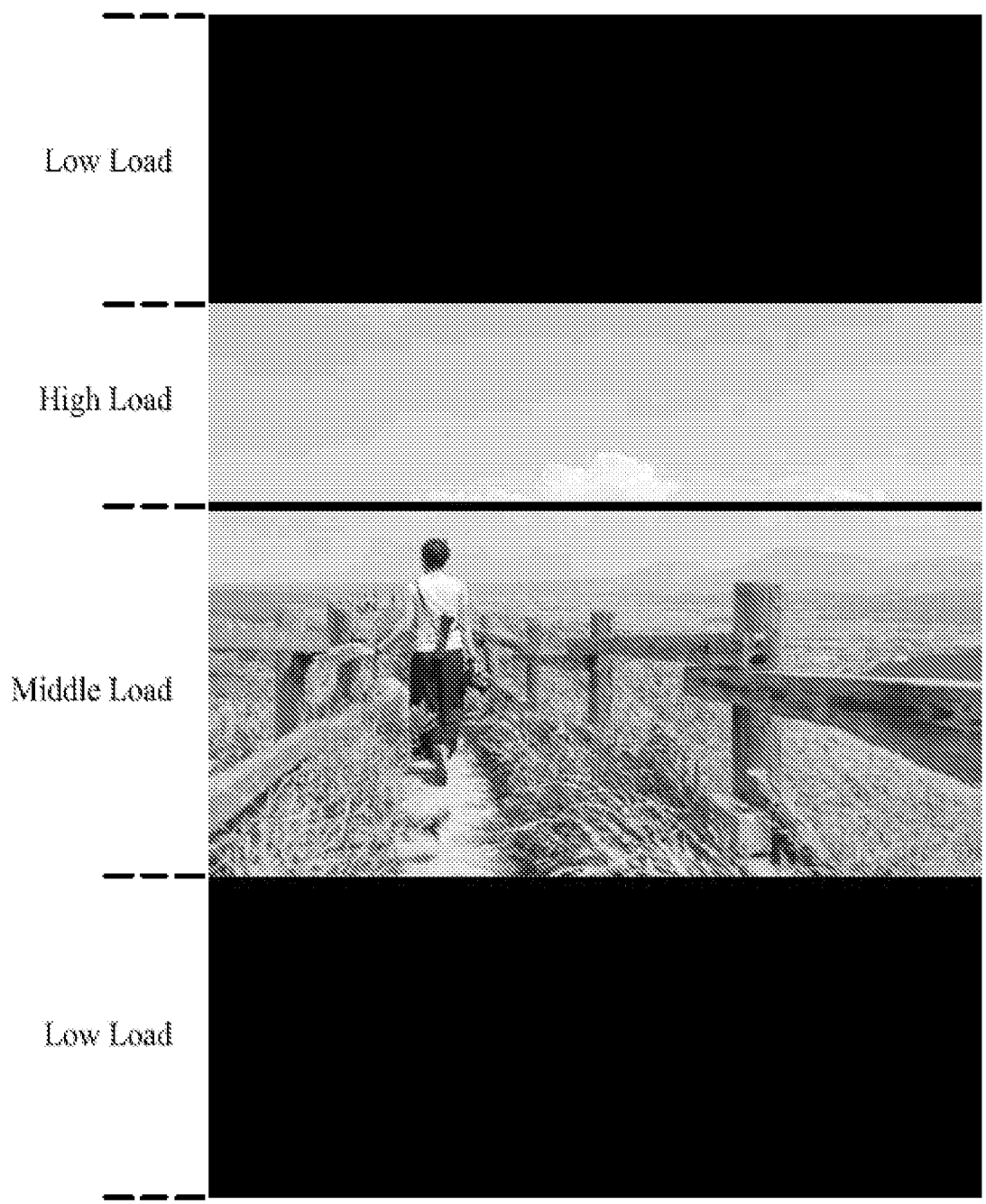
FIG. 7 is a diagram for describing an example where a use pattern is analyzed based on image data.
Figure 8:
FIG. 8 is a diagram for describing another example where a use pattern is analyzed based on image data.

FIG. 7 is a diagram for describing an example where a use pattern is analyzed based on image data, and FIG. 8 is a diagram for describing another example where a use pattern is analyzed based on image data.

A power system 145 according to an embodiment of the present disclosure may receive image data and may analyze a use pattern of a user on the basis of the received image data. In detail, the power system 145 may divide an image into a plurality of regions and may obtain saturation data of each of the plurality of regions so as to obtain edge information corresponding to a contour in an image. In this case, the saturation data may include a saturation variation value, and particularly, may include a saturation variation value and a saturation average value of an edge pixel corresponding to an edge among a plurality of pixels included in a corresponding region.

The power system 145 may group some of the plurality of regions on the basis of the saturation average value. The power system 145 may group the plurality of regions into a first group region including regions including an upper black image, a second group region including regions including a lower black image, a third group region including regions including a sky image in a scene image disposed between the upper black image and the lower black image, and a fourth group region including the other regions, with respect to an image illustrated in FIG. 7.

The power system 145 may obtain luminance data of each of the first to fourth group regions. In this case, the luminance data may include a luminance minimum value, a luminance maximum value, and a luminance average value. Hereinafter, for convenience of description, a luminance minimum value, a luminance maximum value, and a luminance average value may be referred to as a luminance value.

In the image illustrated in FIG. 7, a luminance value may be low in the first group region and the second group region, and thus, power corresponding to a low load may be output in the first group region and the second group region. Also, a luminance value may be high in the third group region, and thus, power corresponding to a high load may be output in the third group region. Also, a luminance value may be middle in the fourth group region, and thus, power corresponding to a middle load may be output in the fourth group region.

The power system 145 may accumulate a luminance value of each region or each group region to check a tendency of a luminance value frequency number. The power system 145 may analyze a use pattern of a user on the basis of a tendency of a luminance value frequency number of each region or each group region and may predict a pixel degradation degree of each region or each group region on the basis of the use pattern.

When a frequency number where the image illustrated in FIG. 7 is displayed on the display panel 140 by a user is high, the power system 145 may determine that a pixel degradation degree of pixels corresponding to the third group region is high and may perform luminance compensation on the pixels corresponding to the third group region.

The power system 145 may predict the amount of supplied current on the basis of luminance-compensated image data and may supply the display panel 140 with power corresponding to the predicted amount of supplied current.

Moreover, when a text is included in an image as illustrated in FIG. 8, a luminance value may be high in group regions including a text, and power corresponding to a high load may be output. When a frequency number where the image including the text is displayed on the display panel 140 by the user is high, the power system 145 may perform luminance compensation on pixels corresponding to a group region including a text.

Figure 9:
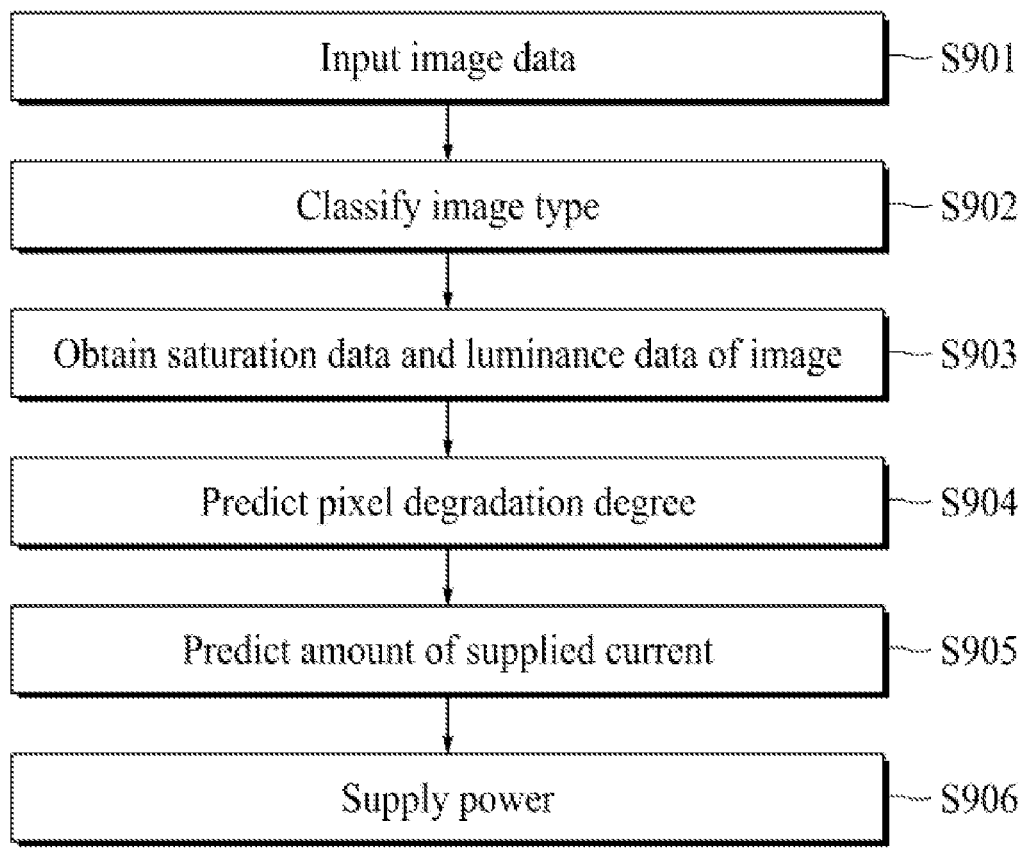
FIG. 9 is a flowchart illustrating a power supply method according to an embodiment of the present disclosure.

FIG. 9 is a flowchart illustrating a power supply method according to an embodiment of the present disclosure.

Referring to FIG. 9, first, the power system 145 may receive image data from the external host system 110 in operation S901. The host system 110 may convert image data into a format suitable for displaying an image on the display panel 140 and may transfer the converted image data to the timing controller 120 and the image data analyzer 150.

Subsequently, in operation S902, the power system 145 may classify the type of an image corresponding to the image data. The power system 145 may input the image to an image type determination model to determine an image type. The image type determination model may correspond to a model which has previously learned the image type of the image by using the CNN algorithm. When the image is input, the image type determination model may output one of a plurality of image types as an image type of a corresponding image.

Subsequently, in operation S903, the power system 145 may obtain saturation data and luminance data of the image. In detail, the power system 145 may determine a size of a region which is to be divided based on the determined image type. A size of a region corresponding to each of the plurality of image types may be predetermined, or may be set by a user. For example, in a text or night of image types, a change in image characteristic such as a gray level, a saturation, or luminance may be small, and thus, a size of a divided region may be set to be relatively large. On the other hand, in an animal or a center of town of the image types, a change in image characteristic such as a gray level, a saturation, or luminance may be large, and thus, a size of a divided region may be set to be relatively small.

The power system 145 may divide the image into a plurality of regions each having a predetermined size and may obtain saturation data and luminance data of each of the plurality of regions.

The power system 145 may obtain saturation data of each of the plurality of regions, so as to obtain edge information corresponding to a contour in the image. In this case, the saturation data may include a saturation variation value, and particularly, may include a saturation variation value and a saturation average value of an edge pixel corresponding to an edge among a plurality of pixels included in a corresponding region. In an embodiment, the saturation data may further include at least one of the number of edge pixels and positions of the edge pixels in a corresponding region.

The power system 145 may group some of the plurality of regions on the basis of the saturation average value. The power system 145 may group regions, where saturation average values are the same or similar, of regions disposed at a periphery thereof. In this case, the power system 145 may group regions, including an image corresponding to the same gate line in the display panel 140, into the same group.

The power system 145 may obtain luminance data of each of the plurality of regions. In this case, the luminance data may include a luminance minimum value and a luminance maximum value. In an embodiment, the power system 145 may obtain at least one of a luminance minimum value, a luminance maximum value, and a luminance average value of each of a plurality of group regions. In an embodiment, the power system 145 may further obtain a luminance average value of a total image.

Subsequently, in operation S904, the power system 145 may predict a pixel degradation degree of each region on the basis of luminance data and saturation data of each region. In detail, the power system 145 may extract a specific region, where high luminance is continuously maintained, of a plurality of regions and may predict a pixel degradation degree of the specific region. To this end, the power system 145 may analyze a tendency of luminance data by using at least one of a luminance minimum value, a luminance maximum value, and a luminance average value of each region or each group region and may obtain a frequency number of use of high luminance.

The power system 145 may predict a pixel degradation degree of each region or each group region on the basis of a frequency number of use of high luminance. In an embodiment, the degradation degree predictor 238 may predict a pixel degradation degree based on a frequency number of use of high luminance by using the linear regression model.

The power system 145 may predict a pixel degradation degree by further using saturation data of each region, in addition to a tendency of luminance data of each region or each group region. The saturation data may include a saturation variation value of an edge pixel, and moreover, may further include at least one of the number of edge pixels and positions of the edge pixels.

The power system 145 may determine a final pixel degradation degree on the basis of a first pixel degradation degree determined based on a tendency of luminance data and a second pixel degradation degree determined based on saturation data. In an embodiment, the power system 145 may assign a weight value to each of the first pixel degradation degree and the second pixel degradation degree and may summate a weight value-assigned first pixel degradation degree and a weight value-assigned second pixel degradation degree to determine a final pixel degradation degree.

The power system 145 may determine a luminance compensation value of each region on the basis of a pixel degradation degree of each region and may convert image data input to the image data input unit 210 on the basis of the luminance compensation value of each region.

Subsequently, in operation S905, the power system 145 may predict the amount of supplied current on the basis of the converted image data. In detail, the power system 145 may analyze a histogram of the image data to obtain a grayscale-based frequency number of each of a plurality of colors. The image data may include color and grayscale information about each of the pixels. The color may include red, green, and blue, and a gray level may include 0 to 255.

The power system 145 may obtain a line-based and grayscale-based frequency number of each line. The line may correspond to a gate line. In an embodiment, the power system 145 may obtain a frame-based, driving IC-based, color-based, or grayscale-based frequency number.

The power system 145 may predict the amount of current supplied to the display panel 140 on the basis of a color/grayscale-based frequency number and a color/grayscale-based current weight value obtained through histogram analysis. Here, a current weight value may represent a degree to which the supplied current contributes to a driving current and may be stored by color units and by gray level units in a lookup table.

Subsequently, in operation S906, the power system 145 may supply the display panel 140 with power corresponding to the predicted amount of supplied current.

According to the present disclosure, the amount of supplied current may be predicted based on image data, and thus, a ripple of a driving power supplied to a display panel may be stably managed and a response time and a stabilization time may be shortened.

Moreover, according to the present disclosure, a pixel degradation degree of pixels included in the display panel may be predicted by analyzing the image data, and a power may be supplied to the display panel on the basis of compensation based on the pixel degradation degree. Accordingly, according to the present disclosure, an optimal power for displaying an image on the display panel may be supplied in real time.

Moreover, according to the present disclosure, the power system may be driven by the PWM scheme or the PFM scheme on the basis of the amount of load, thereby enhancing operation efficiency and optimizing power consumption.

The above-described feature, structure, and effect of the present disclosure are included in at least one embodiment of the present disclosure, but are not limited to only one embodiment. Furthermore, the feature, structure, and effect described in at least one embodiment of the present disclosure may be implemented through combination or modification of other embodiments by those skilled in the art. Therefore, content associated with the combination and modification should be construed as being within the scope of the present disclosure.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A power system for at least one display apparatus, the power system comprising:
   an image data analyzer for analyzing image data to predict a pixel degradation degree of one or more pixels included in a region of a display panel; and
   a power supply for supplying power to the display panel based on the predicted pixel degradation degree, wherein
   the image data analyzer is configured to divide an image corresponding to the image data into a plurality of regions and to predict a pixel degradation degree of each region based on saturation data and/or luminance data of each region.

2. The power system of claim 1, wherein
   the image data analyzer is configured to predict an amount of current supplied to the display panel on the basis of the predicted pixel degradation degrees of the plurality of regions, and
   the power supplied by the power supply corresponds to the predicted amount of the supplied current.

3. The power system of claim 1, wherein the image data analyzer comprises:
   an image type determiner for inputting the image data to an image type determination model, thereby determining an image type of the image data; and
   a region divider for determining a size of each region included in the plurality of regions on the basis of the image type and dividing the image into the plurality of regions.

4. The power system of claim 1, wherein the image data analyzer comprises:
   a luminance data obtainer for obtaining luminance data including at least one of a luminance minimum value, a luminance maximum value, and a luminance average value of each of the plurality of regions, and/or
   a saturation data obtainer for obtaining saturation data including at least one of a saturation average value and a saturation variation value of each of the plurality of regions.

5. The power system of claim 4, wherein the image data analyzer comprises a degradation degree predictor for analyzing the luminance data of each region and predicting the pixel degradation degree of each region on the basis of the luminance data of each region and the saturation data of each region.

6. The power system of claim 1, wherein the image data analyzer comprises:
   a luminance compensator for determining a luminance compensation value of each region on the basis of the pixel degradation degree of each region and converting the image data on the basis of the luminance compensation value of each region; and
   a current supply amount predictor for predicting an amount of current supplied to the display panel on the basis of the converted image data.

7. The power system of claim 6, wherein the luminance compensator is configured to:
   for each of one or more regions included in the plurality of regions, check a luminance minimum value of the region with respect to a total image luminance average value or a luminance maximum value of the region with respect to the total image luminance average value,
   for each of said one or more regions, when the checked luminance minimum value or the checked luminance maximum value of the region with respect to the total image luminance average value is greater than a reference value, determine the luminance compensation value of the region on the basis of the pixel degradation degree of the region, and
   when the checked luminance minimum value or the checked luminance maximum value of the region with respect to the total image luminance average value is less than the reference value, determine the luminance compensation value of the region as 0.

8. A method for driving at least one display apparatus, the method comprising:
   analyzing image data to predict a pixel degradation degree of one or more pixels included in a region of a display panel; and
   supplying power to the display panel based on the predicted pixel degradation degree, wherein analyzing the image data comprises:
   dividing an image corresponding to the image data into a plurality of regions; and
   predicting a pixel degradation degree of each region based on saturation data and/or luminance data of each region.

9. The method of claim 8, the method comprising:
   predicting an amount of current supplied to the display panel on the basis of the predicted pixel degradation degrees of the plurality of regions, wherein
   the supplied power corresponds to the predicted amount of the current supplied to the display panel.

10. The method of claim 8, the method comprising:
    inputting the image data to an image type determination model, thereby determining an image type of the image data;
    determining a size of each region included in the plurality of regions on the basis of the image type; and
    dividing the image into the plurality of regions using the determined size.

11. The method of claim 8, the method comprising:
obtaining luminance data including at least one of a luminance minimum value, a luminance maximum value, and a luminance average value of each of the plurality of regions, and/or
obtaining saturation data including at least one of a saturation average value and a saturation variation value of each of the plurality of regions.

12. The method of claim 11, the method comprising:
analyzing the luminance data of each region; and
predicting the pixel degradation degree of each region on the basis of the luminance data of each region and the saturation data of each region.

13. The method of claim 8, the method comprising:
determining a luminance compensation value of each region on the basis of the pixel degradation degree of each region;
converting the image data on the basis of the luminance compensation value of each region; and
predicting an amount of current supplied to the display panel on the basis of the converted image data.

14. The method of claim 13, the method comprising:
for each of one or more regions included in the plurality of regions, checking a luminance minimum value of the region with respect to a total image luminance average value or a luminance maximum value of the region with respect to the total image luminance average value;
for each of said one or more regions, when the checked luminance minimum value or the checked luminance maximum value of the region with respect to the total image luminance average value is greater than a reference value, determining the luminance compensation value of the region on the basis of the pixel degradation degree of the region; and
when the checked luminance minimum value or the checked luminance maximum value of the region with respect to the total image luminance average value is less than the reference value, the luminance compensation value of the region is determined to be 0.

15. The method of claim 9, the method comprising:
analyzing a histogram of the image data to obtain a grayscale-based frequency number of each of a plurality of colors; and
predicting the amount of the current supplied to the display panel on the basis of the grayscale-based frequency number of each of the plurality of colors and a grayscale-based current weight value of each of the plurality of colors.

16. A method for driving at least one display apparatus, the method comprising:
analyzing image data to predict a pixel degradation degree of one or more pixels in a region of a display panel;
determining one of a high power mode, a middle power mode, and a low power mode as an operation mode of said at least one display apparatus based on the predicted pixel degradation degree; and
based on the determined operation mode, supplying first power or second power to the display panel, wherein
supplying the first power or the second power to the display panel comprises:
using a pulse width modulation (PWM) scheme to supply the first power to the display panel in case the high power mode is determined as the operation mode; and
using a pulse frequency modulation (PFM) scheme to supply the second power to the display panel in case either the middle power mode or the low power mode is determined as the operation mode.

17. The method of claim 16, the method comprising:
predicting an amount of current supplied to the display panel on the basis of the predicted pixel degradation degree, wherein
the supplied power corresponds to the predicted amount of the current supplied to the display panel.

* * * * *